(12) United States Patent  
Kleinewegen

(10) Patent No.: US 10,087,993 B2  
(45) Date of Patent: Oct. 2, 2018

(54) CLAW COUPLING

(71) Applicant: SIEMENS AKTIENGESELLSCHAFT, München (DE)

(72) Inventor: Stefan Kleinewegen, Bocholt (DE)

(73) Assignee: Siemens Aktiengesellschaft, München (DE)

( * ) Notice: Subject to any disclaimer, the term of this patent is extended or adjusted under 35 U.S.C. 154(b) by 193 days.

(21) Appl. No.: 15/142,727

(22) Filed: Apr. 29, 2016

(65) Prior Publication Data

US 2016/0319886 A1    Nov. 3, 2016

(30) Foreign Application Priority Data

Apr. 30, 2015   (EP) .................................... 15001280

(51) Int. Cl.
F16D 3/52          (2006.01)
F16D 3/68          (2006.01)

(52) U.S. Cl.
CPC ..................... F16D 3/68 (2013.01)

(58) Field of Classification Search
CPC ........................................................ F16D 3/68
USPC ............................................ 464/73, 75, 76
See application file for complete search history.

(56) References Cited

U.S. PATENT DOCUMENTS

| 2,706,897 | A | 4/1955 | Jules |
| 6,123,620 | A | 9/2000 | Polakowski |
| 7,883,423 | B2 * | 2/2011 | Kubota ..................... F16D 3/68 464/73 |

FOREIGN PATENT DOCUMENTS

| DE | 29622017 U1 | 2/1997 |
| DE | 29806632 U1 | 8/1998 |
| EP | 2500594 A1 | 9/2012 |
| FR | 1.104.652 | * 11/1955 |
| JP | S58211022 A | 12/1983 |

* cited by examiner

*Primary Examiner* — Gregory John Binda
(74) *Attorney, Agent, or Firm* — Henry M. Feiereisen LLC

(57) ABSTRACT

A claw coupling includes two coupling elements disposed in opposite relationship and having confronting end face surfaces from which claws engage alternately into one another. A pressure body ring, disposed between the two coupling elements, includes a ring element and pressure bodies which project radially outwards from the ring element and are respectively received between two adjacently disposed claws of the coupling elements. Some pressure bodies have each an axially projecting spacer with a contact surface which, when a predefined torque is transmitted via the claw coupling, is pressed against a contact surface area of the end face surface of an adjacent coupling element. The contact surface area is slanted or curved such that, in a no-load state of the claw coupling an axial distance between the contact surface of the spacer and the contact surface area of the end face surface increases in a radially outwards direction.

8 Claims, 4 Drawing Sheets

CLAW COUPLING

CROSS-REFERENCES TO RELATED APPLICATIONS

This application claims the priority of European Patent Application, Serial No. 15001280.5, filed Apr. 30, 2015, pursuant to 35 U.S.C. 119(a)-(d), the disclosure of which is incorporated herein by reference in its entirety as if fully set forth herein.

BACKGROUND OF THE INVENTION

The present invention relates to a claw coupling.

The following discussion of related art is provided to assist the reader in understanding the advantages of the invention, and is not to be construed as an admission that this related art is prior art to this invention.

Claw couplings find application to transmit a torque between two shafts aligning with one another, such as between a motor shaft and a transmission shaft for example, and include two coupling elements disposed axially opposite one another, having end face surfaces facing towards one another, from which claws engaging alternately into one another project, and a pressure body arrangement disposed between the coupling elements and made of elastic material. The pressure body arrangement includes a ring element and pressure bodies projecting radially outwards from the ring element, which are each received between a claw of one coupling element and a claw of the other coupling element. During operation the two coupling elements turn relative to one another in accordance with the torque present and the stiffness of the elastic material of the pressure body ring. Each claw of the coupling elements executes hereby a rotational movement, with a point of a side surface of a claw disposed radially further out moving on a greater circular track than a point of a side surface of a claw disposed radially further inwards and thereby covering a greater distance. This leads to each pressure body of the pressure body ring being pressed together more on the outside than on the inside, which results in an uneven pressure distribution, in which a higher edge pressure acts radially outwards. Accordingly the pressure bodies are pushed radially inwards during the operation of the claw coupling, thereby frequently causing a significant and undesired deformation of the ring element of the pressure body ring.

Attempts have been made to prevent this deformation of the ring element by limiting the maximum permissible torque of a claw coupling. In this way impermissibly high forces directed inwards, acting on the pressure bodies, can be prevented, through which a deformation of the ring element of the pressure body ring can be effectively counteracted. The maximum permissible torque is however to be set very low here. Another approach involves replacing the ring element of the pressure body ring by a circular washer, in order to lend a greater stiffness to the arrangement in the radial direction. A drawback of this approach to configure the pressure body arrangement resides in the fact that a shaft can then no longer project into the claw coupling, thereby restricting construction.

It would therefore be desirable and advantageous to provide an improved claw coupling to obviate prior art shortcomings.

SUMMARY OF THE INVENTION

According to one aspect of the present invention, a claw coupling includes two coupling elements disposed in opposite relationship and aligned in relation to a longitudinal axis, the coupling elements having end face surfaces which face towards one another and from which claws projects and engage alternately into one another, the claws disposed on corresponding circular rings; and a pressure body ring disposed between the two coupling elements and made of elastic material, the pressure body ring including a ring element and pressure bodies which project radially outwards from the ring element and are respectively received between two adjacently disposed claws of the coupling elements, with at least a few of the pressure bodies being each provided with at least one axially projecting spacer having a contact surface which, when a predefined torque is transmitted via the claw coupling, is pressed against a contact surface area of the end face surface of an adjacent one of the coupling elements, with contact surface area being slanted or curved such that, in a no-load state of the claw coupling an axial distance between the contact surface of the spacer and the contact surface area of the end face surface increases in a radially outwards direction.

During transmission of a torque from a coupling element to another coupling element, the pressure bodies of the pressure body ring are deformed such that the end face surfaces of the respective pressure bodies with the spacers disposed thereon bulge out until the contact surfaces of the spacers come into engagement with the contact surface areas of the end face surfaces of the coupling elements when a specific torque is exceeded, thereby initially realizing an axial fixing of the pressure bodies. As the torque continues to increase, the contact surfaces are then pressed against the contact surface areas, causing a deformation of the spacers. In view of the slanted or curved configuration of the contact surface areas of the end face surfaces of the coupling elements, the deforming spacers, together with the pressure bodies from which they project, are prevented from a radial inwards movement, so that the load is relieved on the ring element of the pressure body ring. In this way a deformation of the ring element of the pressure body ring in the radially inwards direction is effectively counteracted.

According to another advantageous feature of the present invention, each coupling element can have four claws, and the pressure body ring can have eight pressure bodies. Such a construction has proven to be very advantageous in terms of a torque transmission.

According to another advantageous feature of the present invention, each pressure body can be provided with at least one spacer. As a result, forces are distributed evenly across the pressure body ring.

According to another advantageous feature of the present invention, the spacer of one of the pressure bodies and the spacer of an adjacent one of the pressure bodies can be configured to project axially in opposite directions. This configuration is also able to enhance even force distribution.

According to another advantageous feature of the present invention, each pressure body can be provided with at least two spacers, which project in opposite directions.

According to another advantageous feature of the present invention, the contact surfaces of the spacers can have a slanted or curved configuration. Advantageously, the contact surfaces of the spacers can have a slanted or curved configuration in correspondence to the contact surface areas of the end face surfaces of the coupling elements.

According to another advantageous feature of the present invention, the contact surfaces of the spacers can have an elongated, in particular oval, configuration in a radial direction. As a result, during the operation of the claw coupling, comparatively great forces directed radially outwards can be generated.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
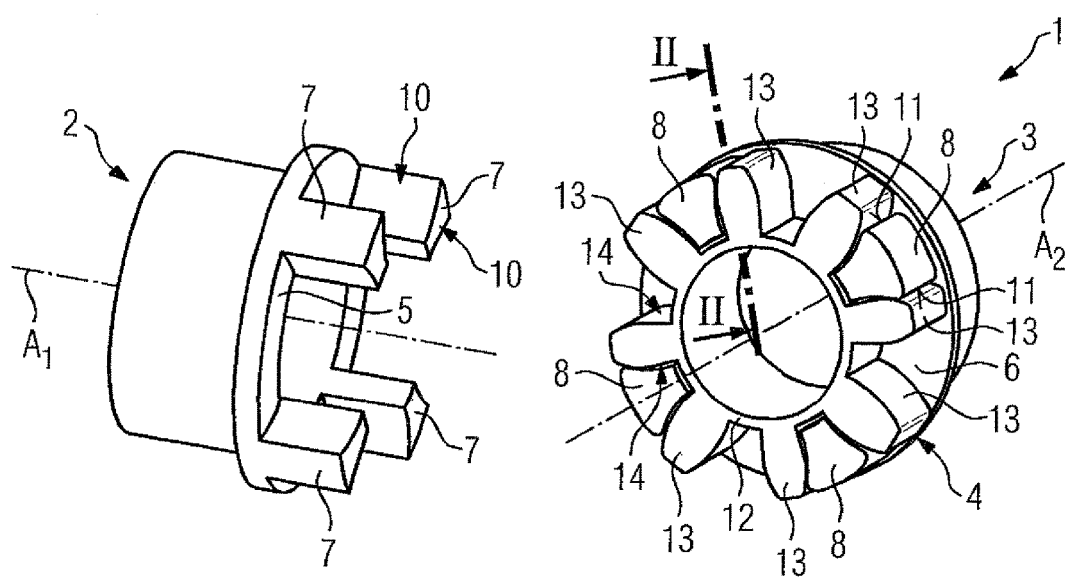
FIG. 1 is a perspective view of one embodiment of a claw coupling according to the present invention in a partly assembled state.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective view of one embodiment of a claw coupling according to the present invention, generally designated by reference numeral 1 and depicted in a partly assembled state. The claw coupling 1 serves to transmit torque between two shafts aligned with one another and comprises as it main components two coupling elements 2, 3 disposed axially opposite one another when assembled according to specification with aligning longitudinal axes $A_1$, $A_2$ as well as a pressure body ring 4 disposed between the coupling elements 2, 3.

The two coupling elements 2, 3 have end face surfaces 5, 6 facing towards each other and of curved configuration, from which alternately engaging claws 7, 8 project, which are each disposed on circular rings corresponding to one another, wherein in the present case each coupling element 2, 3 has four claws 7, 8. Adjacently arranged claws 7, 8 of the coupling elements 2, 3 define hereby a receiving space 9 extending axially between them, which is delimited in the circumferential direction by concave curved claw surfaces 10, 11 of the claws 7, 8 of the coupling elements 2, 3 facing towards one another. The coupling elements 2, 3 are identical in configuration here. As an alternative, it is, of course, also possible to optionally configure the coupling elements 2, 3 and their claws 7, 8 differently.

Figure 7:
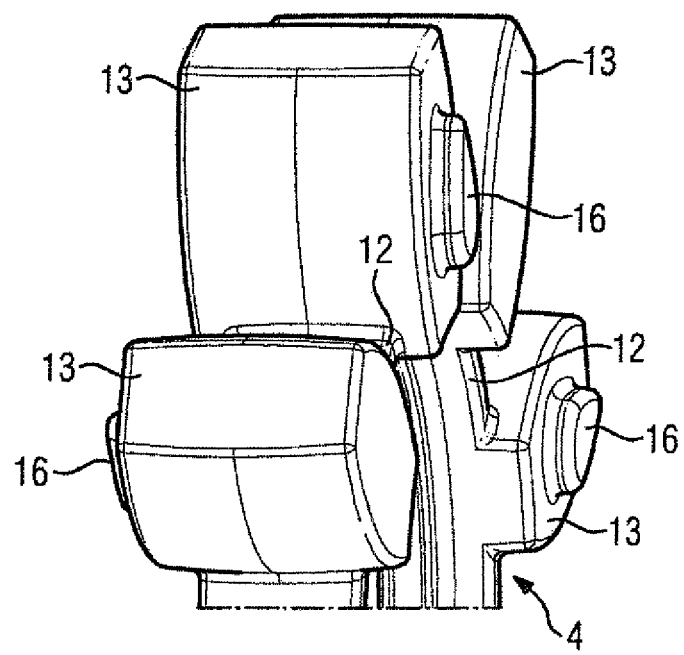
FIG. 7 is a perspective view of a pressure body ring with a ring element and pressure bodies according to the present invention.

The pressure body ring 4 is made from elastic material and includes a ring element 12 as well as eight pressure bodies 13 projecting radially outwards from the ring element 12, with the ring element 12 and the pressure bodies 13 being made in one piece in the present example. The pressure bodies 13 include surfaces 14 that are curved in a convex shape, with the curvatures essentially follow those of the claws 7, 8. Each pressure body 13 is provided on its opposite end face sides 15 (FIGS. 2-4) with an axially projecting spacer 16, which defines a smooth contact surface 17 embodied elongated in an oval shape, wherein the spacers 16 of neighboring pressure bodies 13 each project axially in opposing directions (FIG. 7).

Figure 2:
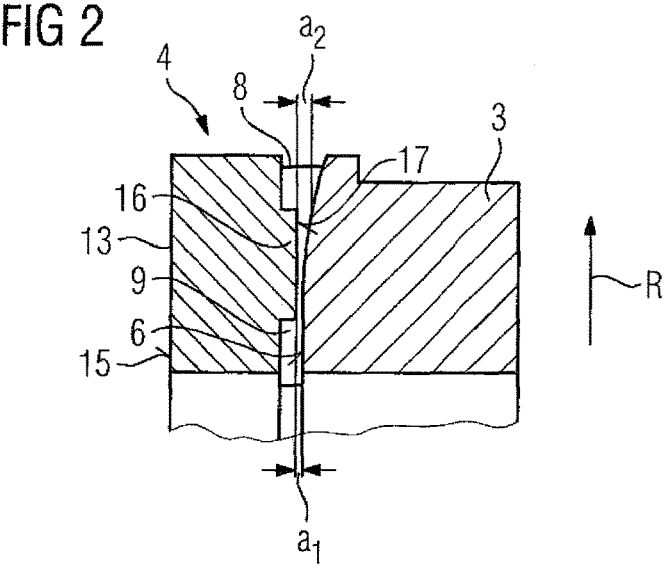
FIG. 2 is a cutaway side view of a coupling element of the claw coupling of FIG. 1, taken along the line II-II in FIG. 1, in a no-load state.

In the assembled state of the claw coupling 1, the pressure body ring 4 is inserted between the two coupling elements 2, 3 such that the individual pressure bodies 13 of the pressure body ring 4 are received into respective receiving spaces 9, which are defined between the side surfaces 10, 11 of the claws 7, 8 facing towards one another. In the no-load state of the claw coupling 1, which is shown in FIG. 2, the spacers 16 projecting from the pressure bodies 13 are spaced slightly apart from the end face surfaces 5, 6 of the coupling elements 2, 3. The curvature of the end face surfaces 5, 6 of the coupling elements 2, 3 is selected such that, in the no-load state of the claw coupling 1, an axial distance between the contact surfaces 17 of the spacers 16 and the end face surfaces 5, 6 or their contact surface areas increases in a radially outwards direction R, as is indicated in FIG. 2 by the indicated distances $a_1$ and $a_2$.

Figure 3:
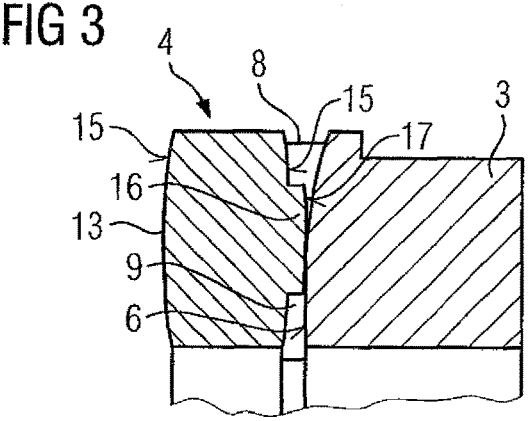
FIG. 3 is a cutaway side view similar to FIG. 2 of the coupling element in a state in which a predefined torque is being transmitted.
Figure 4:
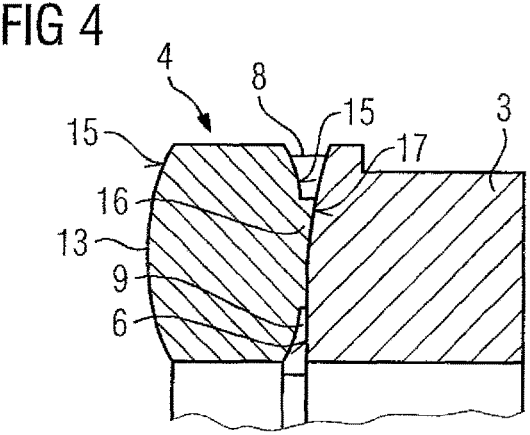
FIG. 4 is a cutaway side view similar to FIG. 2 of the coupling element, in a state in which a rated torque of the claw coupling is being transmitted.

When torque is transmitted by the claw coupling 1, the pressure bodies 13 received between the claws 7, 8 of the coupling elements 2, 3 become deformed such that the end face sides 15 of the pressure bodies 13 bulge out. When a predefined torque is reached, the contact surfaces 17 of the spacers 16 then gradually come into contact with the contact surface areas of the end face surfaces 5, 6 of the coupling elements 2, 3, as is shown in FIG. 3. As the torque continues to increase, starting from this state, for example to the rated torque of the claw coupling 1, then the contact surfaces 17 of the individual pressure bodies 13 press fully against contact surface areas of the end face surfaces 5, 6 of the coupling elements 2, 3, as is shown in FIG. 4. Due to the curvature of the end face surfaces 5, 6, the ring element 12 of the pressure body ring 4 is prevented from being deformed in the radially inwards direction, since the spacers 16 are prevented from making a movement in a radially inwards direction.

Figure 5:
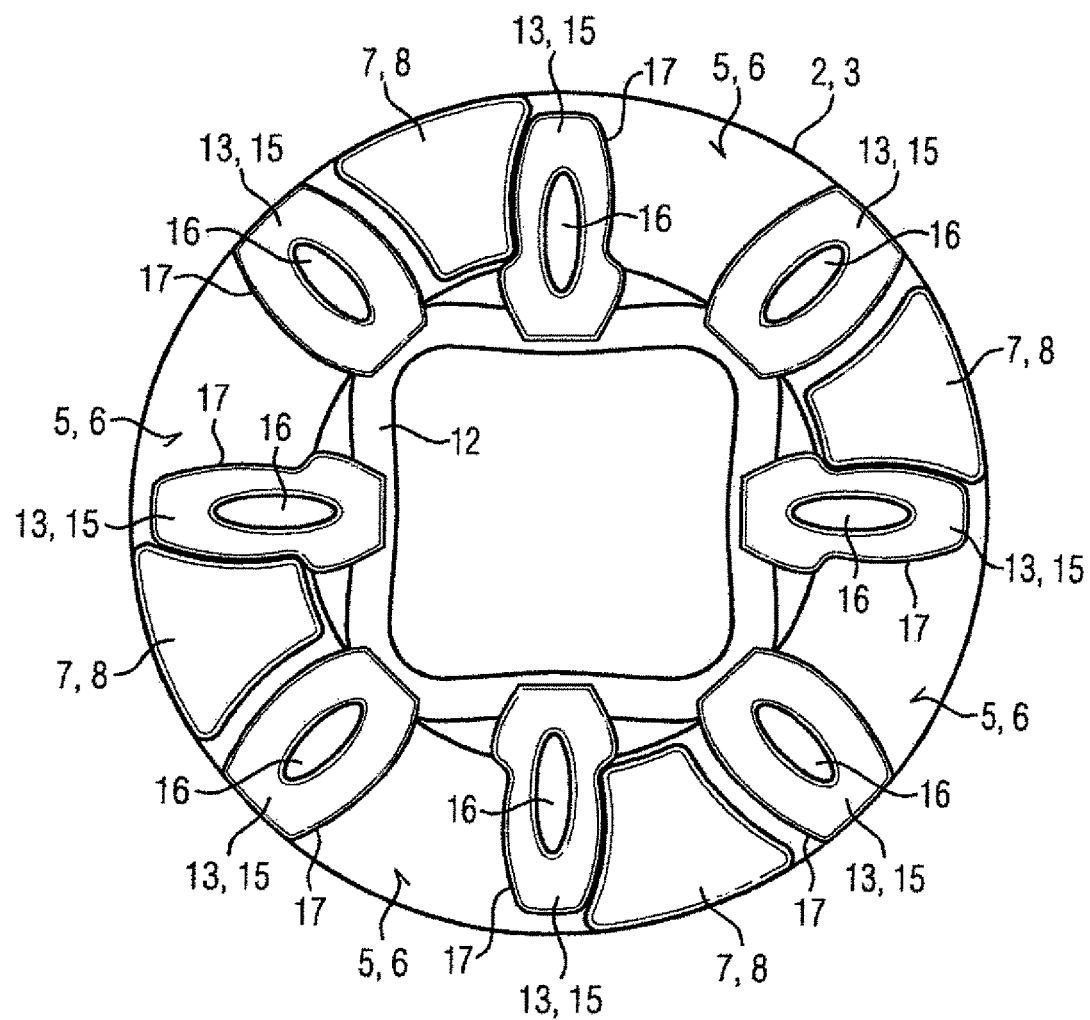
FIG. 5 is a cross-sectional view of one embodiment of a claw coupling according to the present invention.
Figure 6:
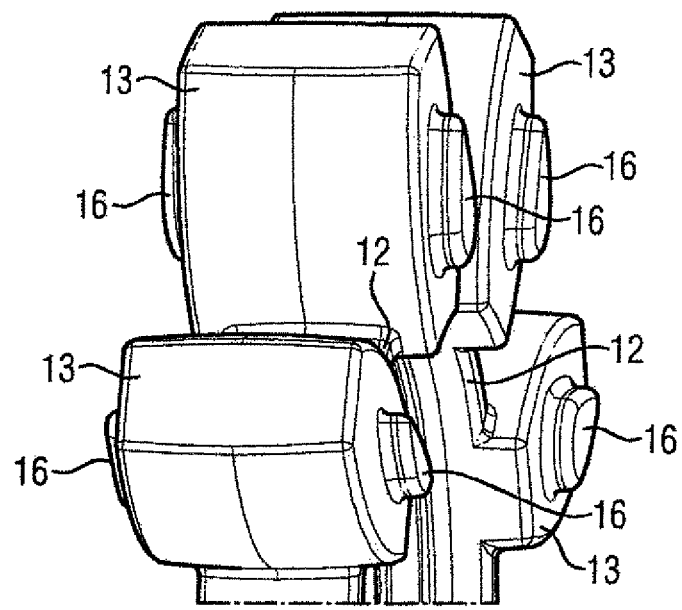
FIG. 6 is a perspective view of a pressure body ring with a ring element and pressure bodies according to the present invention.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated. For example, the end face surfaces 5, 6 of the coupling elements 2, 3 can have a slanted surface, instead of the described curvature. Furthermore, the shape and position of the spacers 16 can vary. Thus for example each pressure body 13 can be provided with two spacers 16, which project in opposite directions from the pressure bodies 13, as shown in FIG. 6. In addition the contact surfaces 17 of the spacers 16 can be embodied slanted or curved, as shown in FIGS. 2 and 5, especially corresponding to the contact surface areas of the end face surfaces 5, 6.

What is claimed as new and desired to be protected by Letters Patent is set forth in the appended claims and includes equivalents of the elements recited therein:

1. A claw coupling, comprising:
   two coupling elements disposed in opposite relationship and aligned in relation to a longitudinal axis, said coupling elements having end face surfaces which face towards one another and from which claws project and engage alternately into one another, said claws disposed on corresponding circular rings; and
   a pressure body ring disposed between the two coupling elements and made of elastic material, said pressure body ring including a ring element and pressure bodies which project radially outwards from the ring element and are respectively received between two adjacently disposed claws of the coupling elements, with at least a few of the pressure bodies being each provided with at least one axially projecting spacer having a contact surface which, when a predefined torque is transmitted via the claw coupling, is pressed against a contact surface area of the end face surface of an adjacent one of the coupling elements, said contact surface area being slanted or curved such that, in a no-load state of the claw coupling an axial distance between the contact surface of the spacer and the contact surface area of the end face surface increases in a radially outwards direction, and said contact surface being slanted or curved such that, in a deformed state of the spacers, the spacers and the respective pressure bodies are prevented from a radial inwards movement.

2. The claw coupling of claim 1, wherein each coupling element has four claws, and the pressure body ring has eight pressure bodies.

3. The claw coupling of claim 1, wherein each pressure body is provided with at least one said spacer.

4. The claw coupling of claim 3, wherein the spacer of one of the pressure bodies and the spacer of an adjacent one of the pressure bodies are configured to project axially in opposite directions.

5. The claw coupling of claim 1, wherein each pressure body is provided with at least two of said spacer, said two spacers projecting in opposite directions.

6. The claw coupling of claim 1, wherein the contact surface of the spacer has a slanted or curved configuration in correspondence to the contact surface area of the end face surface of the adjacent one of the coupling elements.

7. The claw coupling of claim 1, wherein the contact surface of the spacer has an elongated configuration in a radial direction.

8. The claw coupling of claim 1, wherein the contact surface of the spacer has an oval configuration in a radial direction.

* * * * *